Aug. 3, 1943.            J. F. KOVALSKY            2,326,039
                            REGULATOR
                       Filed March 1, 1941
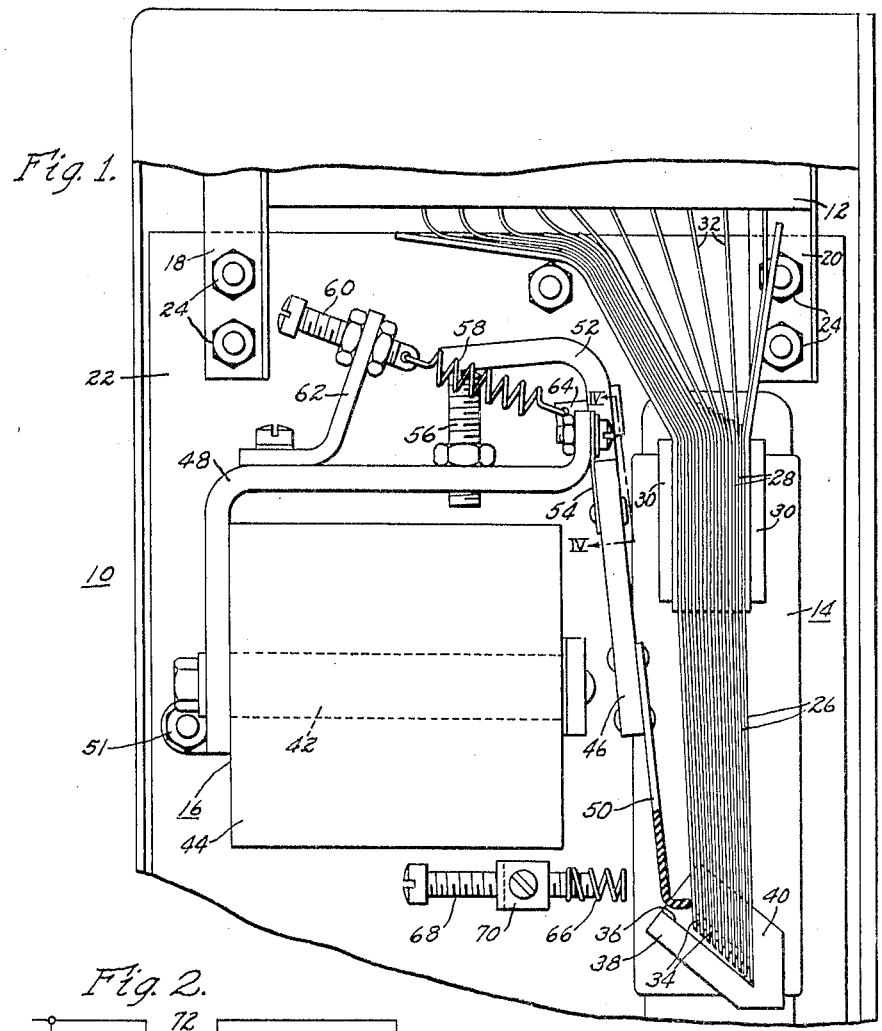
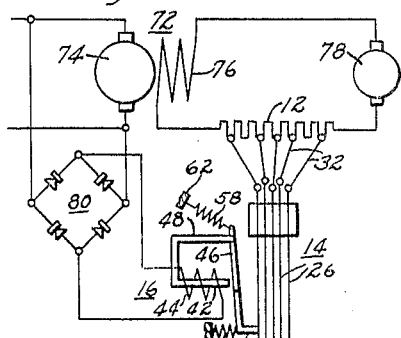
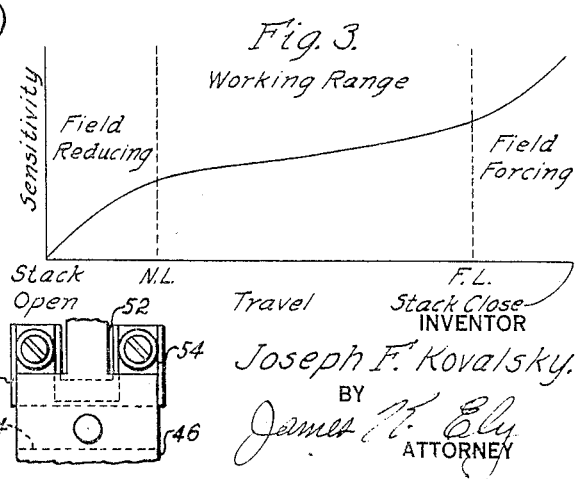
WITNESSES:                              INVENTOR
Leon M. Garman                       Joseph F. Kovalsky.
                                     BY
                                     James K. Ely
                                              ATTORNEY Patented Aug. 3, 1943

2,326,039

UNITED STATES PATENT OFFICE 2,326,039

REGULATOR

Joseph F. Kovalsky, Turtle Creek, Pa., assignor to Westinghouse Electric & Manufacturing Company, East Pittsburgh, Pa., a corporation of Pennsylvania Application March 1, 1941, Serial No. 381,337

2 Claims. (Cl. 200—104)

This invention relates to voltage regulators.

In regulators of the rheostatic type, a switching apparatus is sometimes employed for cutting in or shunting the regulating resistance of a control or energizing circuit. Usually an electroresponsive device, responsive to changes in voltage which it is desired to regulate, is utilized for actuating the switching apparatus. In the usual rheostatic regulator, in order that the regulating device remain stationary at a particular position corresponding to a particular effective value of the regulating resistor, it is necessary that there be a slight variation between the pull curve of the electromagnet and the load curve of the apparatus which opposes its motion. Otherwise the moving element of the regulator would remain stationary in any position instead of in one position only for a given energization of the electroresponsive device and a corresponding pull on the armature.

Heretofore, the degree of sensitivity of the rheostat regulators has been adjusted by varying the pull on the spring opposing the force of the electroresponsive device. When the pull on the spring is varied, the current through the electroresponsive device required to balance the spring force is changed. These changes reduce the range in which an effective change in the regulating resistor can be made for regulating for a particular voltage.

Where rheostatic regulators are employed with low voltage (20 to 40 volts) direct current generators in which current of the order of 4 to 5 amperes is encountered the load curve of the component parts of the regulator is substantially linear over a large portion of the curve and the difference in the load curve and the pull curve is not so marked whereby the degree of sensitivity desired is maintained over a wide range of the curves giving a fairly wide working range for the regulator.

However, where the rheostatic regulators are employed with high voltage (100 to 440 volts) alternating current or direct current generators in which current of the order of .2 milliampere is encountered, it is found that the mere adjustment of the main spring force opposing the pull of the electroresponsive device is not sufficient to give the desired sensitivity over a wide range. Instead, large and complicated regulators have been produced in attempts to obtain the desired linear sensitivity over a wide range. These large and complicated regulators are not satisfactory, however, for service where weight and space are important considerations as well as it being necessary to obtain a substantially linear sensitivity over a wide working range of the regulator.

An object of this invention is to provide for compensating for the changes in the magnetic pull applied in effecting a regulating operation of a regulator to give the regulator predetermined characteristics.

A further object of this invention is to provide in a regulator an electroresponsive device in which opposing forces are so provided to oppose the magnetic pull as to give the regulator a substantially linear sensitivity over a predetermined working range.

Another object of this invention is to provide in a regulator an electroresponsive device and a plurality of biasing means associated therewith for opposing the magnetic pull of the electroresponsive device to give the regulator a substantially linear sensitivity over a predetermined working range.

Other objects of this invention will become apparent from the following description when taken in conjunction with the accompanying drawing, in which:

Figure 1 is a view in elevation of a regulator embodying the features of this invention;

Fig. 2 is a schematic diagram illustrating the apparatus of this invention in a control system;

Fig. 3 is a graph, the curves of which illustrate the sensitivity of the regulator of this invention in terms of travel of the moving parts thereof; and Fig. 4 is a view taken along the line IV—IV of Fig. 1 illustrating a detail of the apparatus there shown.

Referring to Figure 1, there is illustrated the regulator 10 of this invention. The regulator 10 comprises a plurality of component operating parts such as the resistor 12, the primary control device 14 and the electroresponsive device 16 operatively associated together.

The resistor 12 may be of any suitable type and is preferably of the pile type described and claimed in the copending application of C. C. Whittaker, Serial No. 312,517, filed January 5, 1940, and assigned to the assignee of this invention, which application became Patent No. 2,249,876 on July 22, 1941. The resistor 12 is carried between suitable brackets 18 and 20 mounted on a panelboard 22 by any suitable means such as the bolts 24.

The primary control device 14 is preferably of the type described in copending application of C. R. Hanna et al., Serial No. 203,876, filed April 23, 1938, and assigned to the assignee of this invention, which application became Patent No. 2,246,301 on June 17, 1941. This control device comprises a plurality of conducting leaf springs 26 which are self-biased, as will be explained more fully hereinafter, insulated from one another by means of suitable strips 28 of insulating material such as fishpaper or the like, and maintained in an operative position by means of the brackets 30 formed of insulating material and which may be adjustable. With the leaf spring conducting members 26 held in this position by the brackets 30, one end of each of the conducting members 26 is connected either by an extension thereof or by suitable leads 32 to different sections of the resistor unit 12, the connections being so made that the conducting members 26 in the assembled stack are connected progressively to successive sections of the resistor unit 12. The other end of the conductor members 26 may be termed the free ends and carry contact members or buttons 34. The conductor members 26 are normally self-biased toward the left as shown in Fig. 1, so that the ends thereof are adapted to engage an inclined surface 36 of a stop 38 in sequence as the conductor members 26 are moved to the left to permit the separation of the contact buttons 34. In addition to the sloped surface 36, the stop 38 is also provided with an upright stop portion 40 at its lower right-hand edge for cooperating, as will be explained more fully hereinafter, to equalize the contact pressure on the contact buttons 34 carried by the conductor members 26.

The electroresponsive device 16 may be of any suitable type and in this embodiment is illustrated as comprising the substantially U-shaped core member having legs 42 and 43, the energizing winding 44 carried on the leg 42 of the core member, and an armature 46 associated therewith. The electroresponsive device 16 is mounted on the panel 22 by any suitable means such as a screw or bolt 51 through a part of the frame.

In this embodiment, the armature 46 comprises a portion of the actuating member for driving the contact members 26 of the primary control device 14. The armature 46 carries an insulating driving member 50 at its lower end disposed to engage the conductor members 26 at their lower end to actuate the conductor members 26 progressively away from the sloped surface 36 of the stop 38 until they contact the upright stop 40. In this position the pressure on the contact buttons 34 is equalized. The armature 46 forms an extension of a substantially L-shaped lever member 52 and is pivotally mounted to the upwardly extending projections at the end of the leg 48 of the core member by means of a substantially U-shaped spring member 54 as illustrated in Fig. 4. As illustrated, the ends of the legs of the member 54 are secured to the upwardly extending projections at the end of the leg 48 and the armature 46 is secured to the yoke portion of the spring member 54. The U-shaped spring member 54 thereby constitutes a substantially floating pivoting member for the armature 46 and provides a substantially frictionless support for the driving member 50. A stop 56 of non-magnetic material is provided for engaging the end of the lever 52 to limit the movement of the driving member 50 in a counterclockwise direction about the pivot formed by the spring 54.

A main spring 58 is provided for opposing the magnetic pull on the armature 46. The main spring 58 is secured at one end to an adjustable screw 60 carried in a support 62 of non-magnetic material on the leg 48 of the core member, the other end of the spring 58 being secured to a lug 64 carried above the pivot point of the lever 52. As illustrated, the main spring 58 is disposed at an angle of less than 90° to the lever 52 for any position of the lever as it moves through its arc of movement in actuating the conductor members 26 of the primary control device 14. By mounting the spring 58 in this position, the pull on the lever 52 by the spring 58 is a non-linear pull for any of the operating positions of the driving member 50. This positioning of the main spring 58 so changes the force acting on the driving member 50 as the driving member 50 approaches its furthermost position in actuating the conductor members 26 towards the right that the force applied thereto opposing the magnetic pull of the electro-responsive device 16 is decreased to give a more linear sensitivity curve for that portion of the operating cycle of the regulator. The force of the main spring 58 can be adjusted by adjusting the position of the screw 60 in its support 62.

Associated with the electroresponsive device 16 and disposed to be engaged by the driving member 50 is a spring member 66 carried on the end of an adjustable screw 68 which is carried on the panel 22 by the support 70. The spring 66 is preferably threaded on the screw 68 and can be adjusted thereon for changing the effective length of the spring which extends beyond the end of the screw 68. As illustrated, the free end of the spring 66 is disposed to be engaged by the driving member 50 only after the driving member has been actuated by the electroresponsive device a predetermined distance through its arc of movement towards the left to effect a separation of a predetermined number of the contact buttons 34.

By positioning the spring 66 in this manner, it cushions the driving member 50 and prevents a quick snap action of the driving member 50 to effect a separation of all of the contact buttons 34 as the magnetic pull of the electroresponsive device 16 increases. This is quite evident for as the armature 46 moves in a clockwise direction about its pivot due to the pull of the electroresponsive device 16, the armature 46 approaches the core member 42 and the magnetic pull on the armature 46 becomes stronger. With the spring member 66 positioned to engage the driving member 50 at a predetermined point in the arc of movement of the driving member, an additional force is supplied for opposing the magnetic pull of the electro-responsive device 16. The position of the spring 66 and consequently the point at which the opposing force is applied to oppose the pull of the electroresponsive device 16 can be adjusted by adjusting the position of the screw 68 in its support 70.

The spring 66 thus cooperates with the spring 58 which also opposes the magnetic pull on the armature 46 to prevent a quick change in the sensitivity curve of the apparatus as the armature 46 approaches the core member 42 of the electroresponsive device 16. The sensitivity curve in terms of travel of the armature 46 is thus prevented from dropping off fast and a substantially linear curve for this portion of the operating characteristics of the regulator is thus obtained. As will be understood even with the springs 66 and 58 disposed to cooperate as described, when the armature 46 reaches a predetermined position in its arc of movement, the magnetic pull of the electroresponsive device 16 becomes so strong that even with the spring 66 present, a quick change in the sensitivity curve in terms of travel of the moving parts of the apparatus is encountered. Likewise for an extreme position of the driving member 50 at the right-hand portion of its arc of movement, as the magnetic pull becomes smaller the relative force of the spring 58 becomes sufficiently strong to effect a quick change in the right-hand portion of the sensitivity curve of the apparatus.

Referring to Fig. 2, there is illustrated a system in which the apparatus of this invention is connected to provide the desired control of voltage. As illustrated, an alternating current generator 72 is provided for supplying power to any suitable load, not shown. The generator 72 comprises the armature winding 74 and the field windings 76. The field windings 76 are disposed to be energized by an exciter 78 driven from any suitable source of power, not shown, and the resistor element 12 of the regulator of this invention is illustrated as being connected in series circuit relation with the field windings 76. The electroresponsive device 16 of the regulator of this invention is so disposed and connected that the magnetic winding 44 thereof is energized in accordance with a change of the voltage across the armature 74 of the generator 72, a rectifier 80 being provided in circuit therewith for providing direct current excitation of the winding 44. The primary control device 14 is illustrated with the conductor members 26 connected by the leads 32 to different sections of the resistor unit 12.

Although illustrated in both Figs. 1 and 2 for an extreme condition of the circuit, the electroresponsive device 16 and the primary control device 14 are usually so arranged that for a given voltage across the generator armature 74, the magnetic pull of the electroresponsive device 16 to actuate the driving member 40 is balanced by the force of the spring 58 to maintain the driving member in such a position as to permit a portion of the conductor members 26 to be spaced apart thereby electrically connecting a number of the resistor sections of the resistor 12 in circuit with the field windings 76 of the generator 72.

In operation, assuming that the field windings 76 of the generator 72 is energized to provide a predetermined operation of the generator 72, a portion of the resistor unit 12 being in circuit therewith, if for any reason the load supplied by the generator 72 changes thereby effecting a change in the voltage across the armature winding 74, a corresponding change is effected in the energization of the winding 44 of the electroresponsive device 16.

If the change in the voltage across the armature 74 is an increase, the energization of the winding 44 is increased and the driving member 50 is actuated in a clockwise direction about its pivot 54 to permit the conductor members 26 to successively engage the sloped surface 38 of the stop 38 and cut in additional sections of the resistor 12 in circuit with the field winding 76 of the generator 72. If this addition of the sections of the resistor 12 is insufficient to reduce the energization of the field winding 76 to a value where the voltage across the armature 74 reaches a desired value, then the driving member 50 is actuated further until it engages the spring member 66.

The spring member 66 functions as illustrated in Fig. 3 to cooperate with the spring 58 to oppose the magnetic pull of the electroresponsive device 16 and prevent a quick dropping off of the sensitivity curve to maintain it substantially linear over the lower portion of the predetermined working range for a predetermined movement of the driving member 50. If the cutting in of the sections of the resistor unit 12 over this range is still insufficient to effect the necessary decrease in the energization of the field winding 76, then it is found that the magnetic pull of the electromagnetic device 16 becomes so strong as to overcome the opposing force of springs 66 and 58 and effect a quick change in the sensitivity curve illustrated in Fig. 3. Under these conditions the driving member 50 is actuated to effect a quick separation of all of the contact buttons 34 of the conductor members 26 and insert all of the resistor 12 in circuit with the field winding 76. This is known as field reducing in the operation of regulators and control circuits and is illustrated by the left-hand portion of the sensitivity curve of Fig. 3.

If, however, the change in the voltage across the generator armature 74 is a decrease instead of an increase, then the winding 44 of the electroresponsive device 16 is correspondingly deenergized and the force of the spring 58 accordingly actuates the driving member 50 through its arc of movement in the counterclockwise direction about its pivot 54 to effectively actuate successive conductor members 26 from engagement with the stop 38 to shunt additional sections of the resistor 12 from circuit with the field windings 76 to increase the energization of winding 76 and consequently effect an increase in the voltage across the generator armature 74. It is to be noted that as the driving member 50 moves in the counterclockwise direction, the pull of the spring 58 which at all times is non-linear with respect to the movement of the driving member 50 is decreased somewhat due to the change in the lever arm effected by mounting the spring in the manner described. By providing for decreasing the pull of spring 58 in this manner the right-hand portion of the sensitivity curve of the working range illustrated in Fig. 3 is maintained substantially linear with respect to the desired working range of the apparatus. However, if the movement of the driving member 50 towards the right is insufficient to effect the desired energization of the field winding 76, the winding 44 of the electroresponsive device becomes further deenergized with the result that the magnetic pull on the driving member 50 is further decreased and the effective force of the spring 58 is consequently greatly increased at a predetermined position in the arc of movement of the driver member 50 to effect a quick closing of all of the contact buttons 34 to shunt all of the resistor 12 from circuit with the field windings 76. This action is known as field forcing to effect a quick increase in the energization of the field windings. The change in the sensitivity curve by this action is clearly illustrated in the curve of Fig. 3, the force of the spring 58 effecting a quick operation of the last few conductor members 26 to shunt all of the sections of the resistor 12 from circuit with the field winding 76. Under these conditions, all of the conductor members 26 are biased against the stop 49 giving an equalized contact pressure between the contact buttons 34 carried by the conductor members 26. With the field forcing the energization of the field winding 76 is so increased as to quickly restore the desired voltage across the armature 74 of generator 72 and consequently effect a change in the energization of the winding 44 of the electroresponsive device 16 to effect a change in the setting of the primary control device 14 and return the contact conductor members 26 to their normal operating position.

In describing the foregoing apparatus and operation nothing has been said as to the force of the self-biasing conductor members 26. It is, of course, to be understood that the self-biasing conductor members 26 also apply a force which opposes the force of the springs 66 and 58. However, this self-biasing force is so small that for purposes of describing this invention in terms of the spring members 58 and 66 cooperating to oppose the magnetic pull of the electroresponsive device 16, it can be neglected, adjustments naturally being made in the setting of springs 58 and 66 to offset the force of the self-biasing conductor members 26.

With the apparatus of this invention it is possible to provide a regulator which has a substantially linear sensitivity over a predetermined wide working range. With such apparatus it is possible to efficiently regulate the voltage of small direct current and alternating current generators while at the same time retaining the desirable features of field forcing and field reducing. Further, the desired regulation can be obtained by employing a primary control device which has a comparatively few steps for effecting the desired regulation. In addition the regulator is constructed of light weight elements which can be conveniently and efficiently mounted in a small space. This invention therefore provides a regulator which, because of its light weight, the substantially frictionless support of the moving part and its fast action can immediately follow or correct for a change in the voltage which it is desired to regulate without the necessity of any external damping or feed back, a feature which renders it desirable. The compactness when taken in conjunction with the sensitivity obtained renders the regulator of this invention highly desirable for service.

Although this invention has been described with reference to a particular embodiment thereof, it is, of course, not to be limited thereto except insofar as is necessitated by the scope of the appended claims.

I claim as my invention:

1. In a regulator for controlling an electric quantity over a predetermined working range, a control device comprising, in combination, a plurality of contact members normally biased to open circuit position, electromagnetic means disposed for actuating the contact members in sequence, the electromagnetic means comprising a core member, an energizing winding carried by the core member, and a pivotally mounted armature member disposed for movement through a predetermined arc about an axis for driving the contact members, the core member and the armature member having a variable air gap throughout the predetermined arc of movement of the armature member, a biasing means secured to the armature member at an angle of less than 90° for all positions of the armature member as it moves through the predetermined arc to effect a non-linear pull thereon to actuate the armature member in one direction about its axis to sequentially actuate the contact members to circuit closing positions, the energizing winding carried by the core member effecting the actuation of the armature member in the opposite direction about its axis, and another biasing means disposed in the path of movement of the armature member for engagement therewith after the armature member is actuated a predetermined distance in said opposite direction to allow only a part of the contact members to separate, the two biasing means cooperating with the energizing winding carried by the core member to provide a substantially linear sensitivity of the control device embodying the variable air gap over a predetermined working range.

2. In a regulator for controlling an electric quantity over a predetermined working range, a control device comprising, a plurality of self-biased elongated circuit controlling members arranged with one end of each insulated from and supported in fixed relation to each other, the other ends of the members being free to move, contact members carried by the free ends, a stop having a contact surface at an angle to the general direction of the elongated members disposed for spacing the free ends of the members when they seat thereon under the self-biasing influence and to permit unrestricted movement of the elongated members away from the stop, another stop associated with the elongated members to limit their movement away from the angular stop and to insure equalized contact pressure between the contact members under predetermined conditions, electromagnetic means disposed for actuating the circuit controlling members in sequence away from the angular stop, the electromagnetic means comprising a core member, an energizing winding carried by the core member, and a pivotally mounted armature member disposed for movement through a predetermined arc about an axis for driving the circuit controlling members, the core member and the armature member having a variable air gap throughout the predetermined arc of movement of the armature member, a biasing means secured to the armature member at an angle of less than 90° for all positions of the armature member as it moves through the predetermined arc to effect a non-linear pull thereon to actuate the armature member in one direction about its axis to sequentially actuate the circuit controlling members to circuit closing positions, the winding carried by the core member effecting the actuating of the armature member in the opposite direction about its axis, and another biasing means disposed in the path of movement of the armature member for engagement therewith after the armature member is actuated a predetermined distance in said opposite direction to allow only a part of the circuit controlling members to separate, the two biasing means cooperating with the energizing winding carried by the core member and the self-biased circuit controlling members to provide a substantially linear sensitivity of the control device embodying the variable air gap over a predetermined working range.

JOSEPH F. KOVALSKY.